United States Patent
Baillard et al.

(10) Patent No.: US 12,026,829 B2
(45) Date of Patent: Jul. 2, 2024

(54) METHOD FOR PROCESSING A SHADOW IN A 3D SCENE, AND CORRESPONDING DEVICE, SYSTEM AND COMPUTER PROGRAM

(71) Applicant: InterDigital CE Patent Holdings, SAS, Paris (FR)

(72) Inventors: Caroline Baillard, Cesson-Sevigne (FR); Philippe Robert, Rennes (FR); Pierrick Jouet, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 137 days.

(21) Appl. No.: 17/598,554

(22) PCT Filed: Apr. 2, 2020

(86) PCT No.: PCT/IB2020/053176
§ 371 (c)(1),
(2) Date: Sep. 27, 2021

(87) PCT Pub. No.: WO2020/202079
PCT Pub. Date: Oct. 8, 2020

(65) Prior Publication Data
US 2022/0157013 A1  May 19, 2022

(30) Foreign Application Priority Data
Apr. 2, 2019  (EP) .................................. 19305435

(51) Int. Cl.
*G06T 15/50* (2011.01)
*G06T 15/60* (2006.01)
*G06T 19/00* (2011.01)

(52) U.S. Cl.
CPC ............ *G06T 15/506* (2013.01); *G06T 15/60* (2013.01); *G06T 19/00* (2013.01)

(58) Field of Classification Search
CPC ....... G06T 15/506; G06T 15/60; G06T 19/00; G06T 11/00; B01D 2221/04; B01D 21/10;
(Continued)

(56) References Cited

U.S. PATENT DOCUMENTS

| 2011/0234631 A1* | 9/2011 | Kim ........................ G06T 15/60 345/632 |
| 2017/0154237 A1* | 6/2017 | Shen ....................... G06V 20/00 |
| 2020/0329189 A1* | 10/2020 | Tanaka ..................... G06T 17/20 |

FOREIGN PATENT DOCUMENTS

EP  3352138  7/2018

OTHER PUBLICATIONS

See, Zi Siang, and Adrian David Cheok. "Virtual reality 360 interactive panorama reproduction obstacles and issues." Virtual Reality 19.2 (2015): 71-81. (Year: 2015).*

(Continued)

*Primary Examiner* — Daniel F Hajnik
(74) *Attorney, Agent, or Firm* — Klintworth & Rozenblat IP LLP

(57) ABSTRACT

A method for processing a 3D scene, and corresponding device, system and computer program are disclosed. In an example embodiment, the disclosed method includes: obtaining an image comprising at least a nadir view of a 3D scene, captured by at least one camera; detecting, in the image, at least one shadow cast by at least one object of the 3D scene acting as a support for the at least one camera; and determining a direction of at least one real light source from the at least one detected shadow and at least information representative of the object.

19 Claims, 2 Drawing Sheets

(58) Field of Classification Search
CPC ............ B01D 21/2405; B01D 21/2427; B01D 21/2472; C02F 1/40; G06V 20/20
See application file for complete search history.

(56) References Cited

OTHER PUBLICATIONS

MacQuarrie, Andrew, and Anthony Steed. "Object removal in panoramic media." Proceedings of the 12th European Conference on Visual Media Production. 2015. (Year: 2015).*

Liao, Wei-Sheng, Tung-Ju Hsieh, and Yang-Lang Chang. "GPU parallel computing of spherical panorama video stitching." 2012 IEEE 18th International Conference on Parallel and Distributed Systems. IEEE, 2012. (Year: 2012).*

Koeva, Mila, Mila Luleva, and Plamen Maldjanski. "Integrating spherical panoramas and maps for visualization of cultural heritage objects using virtual reality technology." Sensors 17.4 (2017): 829. (Year: 2017).*

Tommaselli, Antonio MG, and Adilson Berveglieri. "Automatic orientation of multi-scale terrestrial images for 3D reconstruction." Remote Sensing 6.4 (2014): 3020-3040. (Year: 2014).*

International Search Report and Written Opinion of the International Searching Authority for PCT/IB2020/053176 mailed Jun. 23, 2020, 13 pages.

Jiddi, Salma, et. al. "Probeless and Realistic Mixed Reality Application in Presence of Dynamic Light Sources". IEEE International Symposium on Mixed and Augmented Reality Adjunct (ISMAR-Adjunct), (2018), pp. 419-420.

Jiddi, Salma, et. al., "Estimation Of Position And Intensity Of Dynamic Light Sources Using Cast Shadows On Textured Real Surfaces". IEEE International Conference on Image Processing (ICIP), (2018), pp. 1063-1067.

Do, Trien V., et. al., "3DARModeler: a 3D Modeling System in Augmented Reality Environment". World Academy of Science, Engineering and Technology International Journal of Mathematical and Computational Sciences, vol. 4, No. 3, (2010), pp. 377-386.

Kolivand, Hoshang, et. al. "Shadow Generation in Mixed Reality: A Comprehensive Survey". IETE Technical Review, vol. 32, No. 1, Jan.-Feb. 2015, pp. 3-15.

Sato, Imari, et al. "Illumination from Shadows". IEEE Transactions on Pattern Analysis and Machine Intelligence, 2002 (12 pages).

Panagopoulos, Alexandros, et al. "Robust Shadow and Illumination Estimation Using a Mixture Model". 2009 IEEE Conference on Computer Vision and Pattern Recognition, (8 pages).

Panagopoulos, Alexandros, et al. "Illumination Estimation and Cast Shadow Detection through a Higher-order Graphical Model". CVPR 2011, pp. 673-680 (8 pages).

International Preliminary Report on Patentability PCT/IB2020/053176 issued on Sep. 28, 2021 (10 pages).

* cited by examiner

METHOD FOR PROCESSING A SHADOW IN A 3D SCENE, AND CORRESPONDING DEVICE, SYSTEM AND COMPUTER PROGRAM

CROSS-REFERENCE SECTION

The present application is a national stage application under 35 U.S.C. § 371 of International Application No. PCT/IB2020/053176, titled "A METHOD FOR PROCESSING A 3D SCENE, AND CORRESPONDING DEVICE, SYSTEM AND COMPUTER PROGRAM" filed on Apr. 2, 2020, which claims the benefit of European Patent Application Serial No. 19305435.0 filed Apr. 2, 2019, entitled "A Method for Processing a 3D Scene, and Corresponding Device, System, and Computer Program," which is hereby incorporated by reference in its entirety.

TECHNICAL FIELD

The present disclosure relates to the field of images processing.

It offers a technique for processing a 3D scene, and in particular for estimating at least one light source in a 3D scene. Such estimation can be used to enhance the rendering of the 3D scene, for example when virtual objects are inserted into the 3D scene.

BACKGROUND

Mixed or augmented reality generally refers to the addition of computer-generated objects to a view of the real world. For the composite view to be realistic, the computer-generated object normally must be associated with virtual shadows that are consistent with real shadows. This requires, for example, estimating real light sources in a scene, to reproduce them in the virtual world.

However, the real lighting of a scene can be very complex. Several solutions have been proposed to estimate light sources by image analysis.

For example, document EP 3 352 138 discloses a solution according to which real shadows are detected in a standard image, then light sources are estimated, assuming both the camera pose of the image and the 3D geometric model of the scene are known.

However, such solution requires a preprocessing step to model the scene and to estimate the image camera pose. Such solution is thus complex and resource-consuming and time-consuming.

SUMMARY

There is a need for a new technique for processing a 3D scene, and in particular for estimating at least one light source in a 3D scene, that overcomes at least one of the known techniques' drawbacks.

According to an aspect of the present disclosure, a method for processing a 3D scene is disclosed. Such method comprises:
  obtaining an image of at least a nadir view of the 3D scene, captured by at least one camera,
  detecting, in the image, at least one shadow cast by at least one object of the 3D scene acting as a support for one of the cameras, and
  determining the direction of at least one real light source from the detected shadow(s) and at least information representative of the object.

According to the present disclosure, it is thus possible to capture at least one view of the shadows generated by an object supporting a camera, for example a tripod. As some information representative of the object are known (for example its height or a 3D model of the object), it is possible to determine from the shadow of the object (or from the shadow of a set comprising the camera and the object acting as a support for the camera) and from information representative of the object (for example the height of the object, or the height of the set comprising the camera and the object), the direction of the light source(s) in the real 3D scene.

In particular, according to at least one embodiment of the disclosure, such method does not require any prior knowledge about the 3D scene.

According to another embodiment of the disclosure, a device for processing a 3D scene is disclosed. Such device comprises at least one processor configured to perform:
  obtaining an image of at least a nadir view of the 3D scene, captured by at least one camera,
  detecting, in the image, at least one shadow cast by at least one object of the 3D scene acting as a support for one of the cameras, and
  determining the direction of at least one real light source from the detected shadow(s) and information representative of the object.

Such device can be especially adapted to implement the method for processing a 3D scene described here above. For example, such device is a mobile device such as a smartphone, a tablet, smart glasses, head-mounted display, and so on. In particular, the camera capturing the 3D scene in the nadir view can be part of the device. It can be for example a simple camera, a large field of view camera, or a 360-degrees camera.

Another aspect of the disclosure pertains to at least one computer program product downloadable from a communication network and/or recorded on a medium readable by computer and/or executable by a processor comprising software code adapted to perform a method for processing a 3D scene, wherein the software code is adapted to perform at least one of the steps of the method described above.

In addition, another aspect of the present disclosure relates to a non-transitory computer readable medium comprising a computer program product recorded thereon and capable of being run by a processor, including program code instructions for implementing the method for processing a 3D scene previously described.

At least one embodiment of the disclosure also relates to a system comprising at least one camera and a device for processing a 3D scene. The camera comprises at least one processor configured to perform:
  capturing an image of at least a nadir view of the 3D scene,
  sending the image to the device,
and the device comprises at least one processor configured to perform:
  receiving the image of the 3D scene,
  detecting, in the image, at least one shadow cast by at least one object of the 3D scene acting as a support for the camera, and
  determining the direction of at least one real light source from the detected shadow(s) and information representative of the object.

BRIEF DESCRIPTION OF THE DRAWINGS

The disclosure will be better understood and illustrated by means of the following embodiment and execution examples, in no way limitative, with reference to the appended figures in which.

In the Figures, the represented blocks are purely functional entities, which do not necessarily correspond to physically separate entities. Namely, they could be developed in the form of software, hardware, or be implemented in one or several integrated circuits, comprising one or more processors.

DETAILED DESCRIPTION

It is to be understood that the figures and descriptions of the present disclosure have been simplified to illustrate elements that are relevant for a clear understanding of the present disclosure, while eliminating, for purposes of clarity, many other elements found in typical camera and mobile devices.

The present disclosure relates to the field of image processing. More particularly, the present disclosure proposes a technique for processing a 3D scene, and in particular, for estimating at least one light source in a 3D scene. Such estimation may be used to enhance rendering of the 3D scene, for example when virtual objects are inserted into the 3D scene.

The present disclosure is particularly adapted to any applications in which a 3D scene has to be rendered, for example mixed or augmented reality applications.

General Principles

Figure 1:
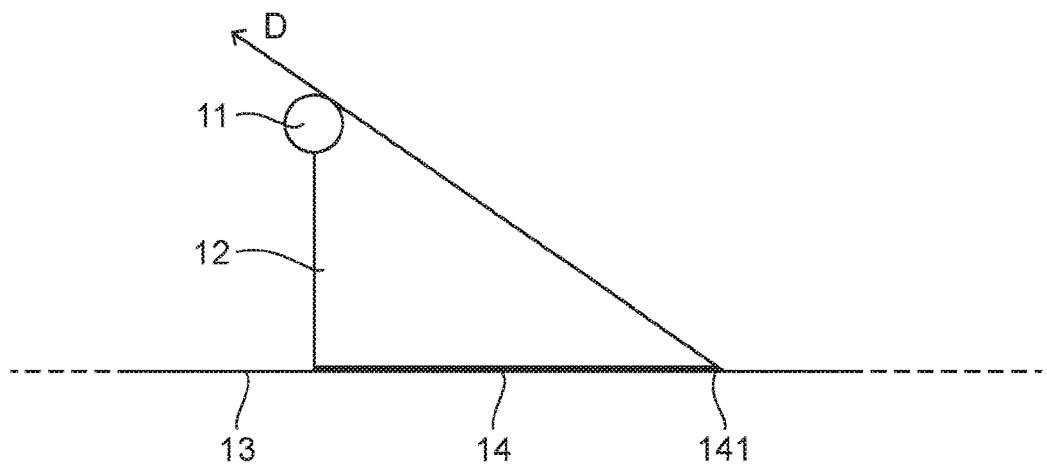
FIG. 1 illustrates an example of a camera positioned on an object acting as a support for the camera, according to some embodiments.

FIG. 1 illustrates an example of a camera positioned on an object acting as a support for the camera, in accordance with some embodiments. As illustrated schematically in FIG. 1, according to this example embodiment, at least one camera 11 is sat atop an object 12, so that the camera does not rest directly on a reference surface 13 on which rests the object 12 (for example on the ground), but is raised compared to the reference surface 13. The distance between the camera 11 and the reference surface 13 should be enough to enable a detection of shadow(s) cast by the object 12 on the reference surface 13. Such distance may vary depending on the location of a light source in a 3D scene. As an example, when the light source is closed to the horizon, a short distance between the camera and the reference surface is typically sufficient (for example few centimeters). As another example, when the light source is closed to the zenith, a longer distance between the camera and the reference surface should normally be used.

Further, according to one embodiment of the disclosure, the camera 11 is part of a device, such as a smartphone for example. The smartphone may be positioned vertically, i.e., for example, in a position with its bottom side resting on the reference surface 13 and its main height being perpendicular to the reference surface 13. In this case, the camera 11 is located at a distance, from the reference surface 13, e.g., close to the main height of the smartphone. Such camera may be for example a 360-degree camera. In this particular embodiment, the object 12 on which the camera rests may be the body of the smartphone.

Figure 2:
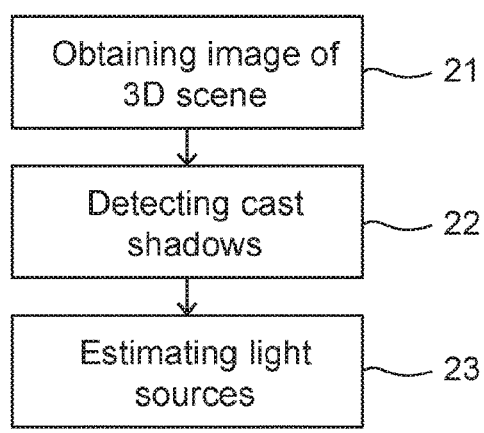
FIG. 2 is a flow chart illustrating example steps of a method for processing a 3D scene, according to some embodiments.

FIG. 2 illustrates an example method for processing a 3D scene, according to some embodiments. Such 3D scene is a real scene illuminated by a set of lights that are to be estimated, for example in order to address augmented/mixed reality application. The method of FIG. 2 is illustrated, by way of example, with reference to FIG. 1.

In step 21, an image of at least a nadir view of the 3D scene is obtained. For example, the image is captured by at least the camera 11. In some embodiments, such image at least represents the nadir view of the 3D scene, i.e., for example, the view from the camera 11 in the direction pointing below the camera 11 (or toward the center of the Earth). In this way, shadow(s) cast by the object 12, or by a set comprising the camera 11 and the object 12, is(are) visible in the image. The camera support indeed typically generates one or several longitudinal shadows on the reference surface below the camera. The image may be a standard image, a large field of view image, a 360° image, for example, obtained from one or more images captured by one or more cameras.

According to an embodiment of the disclosure, the image of at least the nadir view of the 3D scene is obtained by combining a standard image representing the nadir view of the camera 11, and a large field of view image representing an environment captured by said camera or by another camera.

In step 22, at least one shadow 14, cast by the object 12 or cast by a set comprising the camera 11 and the object 12, is detected in the image. Different techniques can be used to detect or extract shadows in an image, such as, for example, those disclosed by I. Sato et al. in "Illumination from Shadows" (PAMI'02), A. Panagopoulos et al. in "Robust Shadow and Illumination Estimation Using a Mixture Model" (CVPR'09), or those disclosed in A. Panagopoulos et al. in "Illumination Estimation and Cast Shadow Detection through a Higher-order Graphical Model" (CVPR'11).

In step 23, a direction D (see FIG. 1) of at least one real light source is determined from the detected shadow(s) 14 and at least one information representative of the object 12, such as the height of the object 12 or of the set comprising the camera 11 and the object 12, or a 3D model of the object 12 or of the set comprising the camera 11 and the object 12. The color and/or intensity of the light source(s) can also be estimated.

For example, as shown in FIG. 1, the object 12 supporting the camera 11 is a vertical support having a main vertical axis. It may comprise three-legs resting on the reference surface 13 for stability. The length of the shadow 14 cast by the object 12 (or the set of camera plus object) is measured in the image. By knowing information representative of the object 12 (or of the set of camera plus object), like its height or a 3D model for instance, it is thus possible to determine the direction D of the light source.

It should be noted that the reference surface may be planar or not. Measuring the length of the shadow cast by the object may be easier if the reference surface is planar, but such length can also be determined if the reference surface is not planar, for example if a 3D model of the reference surface is known. In this latter case, once the shadow cast by the object acting as a support for the camera has been detected, the 3D position of the end of the shadow can be derived from the 3D model of the reference surface. Then, the 3D orientation of the light source can be derived from the 3D positions of both the end of the shadow and the top of the object. The 3D model of the reference surface might be obtained, for example, from a depth sensor associated with the camera.

In some embodiments, it is, however, desired that the altitude of the point located at an end 141 (see FIG. 1) of the shadow 14 cast by the object 12 is the same as the altitude of the reference surface 13 at a location where the object 12 rests on the reference surface 13. According to this example, the reference surface 13 is mainly horizontal.

The object 12 supporting the camera 11 may also have a main vertical axis and a planar base, for example a circular planar base, resting at least partly on the reference surface 13. According to this embodiment, the shadow(s) of the object 12 may be cast on the planar base.

Figure 3:
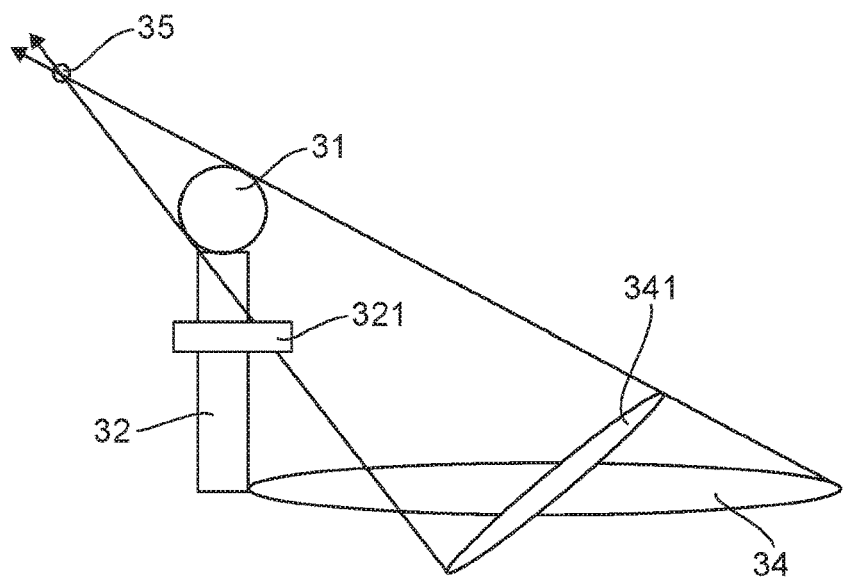
FIG. 3 illustrates another example of a camera positioned on an object acting as a support for the camera, according to some embodiments.

According to another aspect of the disclosure, a position of real light source(s) may be determined from the detected shadow(s). The color and/or intensity of the light source(s) can also be estimated. The position, color and/or intensity of the real light source(s) can, for example, be determined by taking into account the shape of the object and the detected shadows, or potentially the shape of the reference surface. FIG. 3 illustrates another example of a camera positioned on an object acting as a support for the camera, according to some embodiments.

According to such aspect, as illustrated in FIG. 3 by way of example, an object 32 acting as a support for a camera 31 has a vertical axis, but also has at least one branch 321 in another plan (for example horizontal).

In this way, as shown, several shadows are cast by the object 32, at least one shadow 34 being cast by the vertical axis of the object 32, and at least one shadow 341 being cast by the at least one branch 321. Using information representative of the object 32, and such shadows, it is possible to determine a 3D position 35 of a light source, for example at the intersection of a direction of the light source estimated from the shadow 34 cast by the vertical axis of the object 32, and of a direction of the light source estimated from the shadow 341 cast by the at least one branch 321. Different techniques can be used to determine the 3D position of the light source(s), such as for example disclosed in document EP 3 352 138 previously mentioned.

In other words, according to at least one embodiment of the disclosure, at least one of the direction, color and intensity of the light source(s) of the real 3D scene can be estimated in a reference system defined by the position of the object acting as a support for the camera, using at least information representative of the object. If the object acting as a support for the camera is not simply a vertical leg (for example, it has also branches), then the 3D position of the light source(s) (e.g. a streetlight) can be estimated.

Further, in some embodiments, in order to obtain a more realistic rendering of a 3D scene, an estimation of light sources may be combined with a determination of an environment map.

In this way, according to another embodiment of the disclosure, an image of at least a nadir view of a 3D scene is a large field of view image, for example a 360° image. For example, such image can be obtained by combining several images obtained by the same or different cameras. In one example, one camera is used, capturing one large view image or one standard image in the nadir view of the camera (i.e., for example, in the direction pointing below the camera or toward the center of the Earth), and one large view image in the zenith view of the camera (i.e., for example, in the opposite direction, pointing above the camera).

According to this embodiment, an environment map can be determined from the image of the 3D scene, for example a 360° image. Such environment map is, for example, a texture image that can be used to approximate the appearance of a reflective surface. In this way, the present disclosure offers a solution for simultaneously estimating light source directions (for consistent shadows in rendering of the 3D scene) and determining the environment map (for consistent reflections in the rendering of the 3D scene).

In particular, according to one embodiment, determining an environment map comprises removing object(s) acting as a support for camera(s) and detected shadow(s) from an image of a 3D scene and processing occlusion areas.

According to this embodiment, when rendering the 3D scene for example on a screen of a device, the object acting as a support for the camera and its shadows can be removed, and further, replaced to provide a realistic aspect of the 3D scene.

According to a further embodiment, at least one bright area is detected in the environment map. A direction of at least one light source candidate may be determined from the bright area, and at least one virtual shadow cast by said object, lit by the light source candidate, may be detected in a representation of the 3D scene. The direction of the at least one real light source is also determined from the virtual shadow(s).

Such embodiment aims at increasing the robustness of the light source direction estimation by combining the use of the environment map with the shadow-based method.

For example, at least two cameras may be used: one for capturing the 3D scene, at least in the nadir view, and one for capturing the environment.

According to this embodiment, the environment map may be used to detect candidate light sources, corresponding to bright areas in the environment map. The observation of the environment may indeed be used to identify the light sources, and possibly a direction of the light sources, usually area lights. These area lights may be extracted and discretized, and a set of distributed point lights may be selected over each area light. Each point light selected in the environment map provides a 3D direction.

A virtual scene corresponding to the 3D scene can be lit with such point lights, generating shadows in the virtual scene, and especially shadow(s) cast by the object acting as a support for the camera in the 3D scene. The shadow(s) in the virtual scene may be compared to the shadow(s) in the real 3D scene, for example by comparing virtual shadow maps and a real shadow map obtained from the image in the nadir view. The direction or position of 3D point lights is confirmed when the shadow(s) in the virtual scene are similar to the shadow(s) in the real scene.

According to a first example, it can be assumed that the point lights are at a given distance possibly infinite, and to light the virtual scene with this set of virtual point lights.

According to a second example, point lights 3D position is estimated. Each 3D direction is in turn discretized: this defines candidate 3D positions of the corresponding point light. Thus, the set of candidate 3D point lights may be selected by discretizing the set of 3D directions. Then, this set of candidate 3D point lights may be used as inputs of the 3D point lights estimation (such as disclosed by document EP 3 352 138, for example).

According to a third example, the area lights are considered as being roughly planar and also possibly all the selected point lights of a given area light are located at the same distance from the camera capturing the environment.

The selection of the 3D point lights is thus constrained, and the resulting set is used as above to estimate the 3D point lights.

According to a fourth example, the detected area lights and their 3D direction are used to define a volume that contains the 3D point lights and to directly discretize this volume to define the set of candidate 3D point lights that are then used as inputs of the 3D point lights estimation.

According to a fifth example, a pair of cameras is used to capture the environment, and a third camera is used to capture the 3D scene. In this case, stereovision may be applied to the pair of cameras in order to estimate the 3D position of the light areas. The corners of the boundary of the area lights, for example, may be used to estimate their 3D position and a planar constraint may be added to this estimation for each area light independently. Then, each area light may be discretized in the environment map (as described previously), leading now to point lights whose 3D position is derived from the 3D position of the area light. This set of 3D point lights may then be the input of a linear system and their intensity may be estimated.

As this allows to considerably decrease a number of 3D point light candidates, each area light may be possibly more densely discretized. Then in this context, the shadow-based method may be used as in EP 3 352 138, for instance, to select the best point lights and to estimate their intensity.

Note that the estimation of the light source(s) may be regularly updated by capturing new images. If the light sources are static, then the camera and the object acting as a support for the camera can be removed.

According to some embodiments, a method for processing a 3D scene according to the different aspects described herein, and especially, an estimation of light source(s) of the 3D scene, may be implemented by a camera that comprises, for example, a camera SDK (Software Development Kit). According to some embodiments, it may be implemented by an external image processing toolbox. Further, according to some embodiments, it may be implemented by a mobile device, to process at least one image captured by at least one camera. In the latter case, the estimation of the light source(s) may be provided to a rendering engine of the mobile device.

Application to Augmented Reality

The estimation of light source(s) of a 3D scene, and possibly an environment map, as described in various embodiments disclosed herein, may be used to obtain a realistic rendering of the 3D scene, particularly in mixed or augmented reality applications where virtual objects are inserted in the 3D scene.

Figure 4:
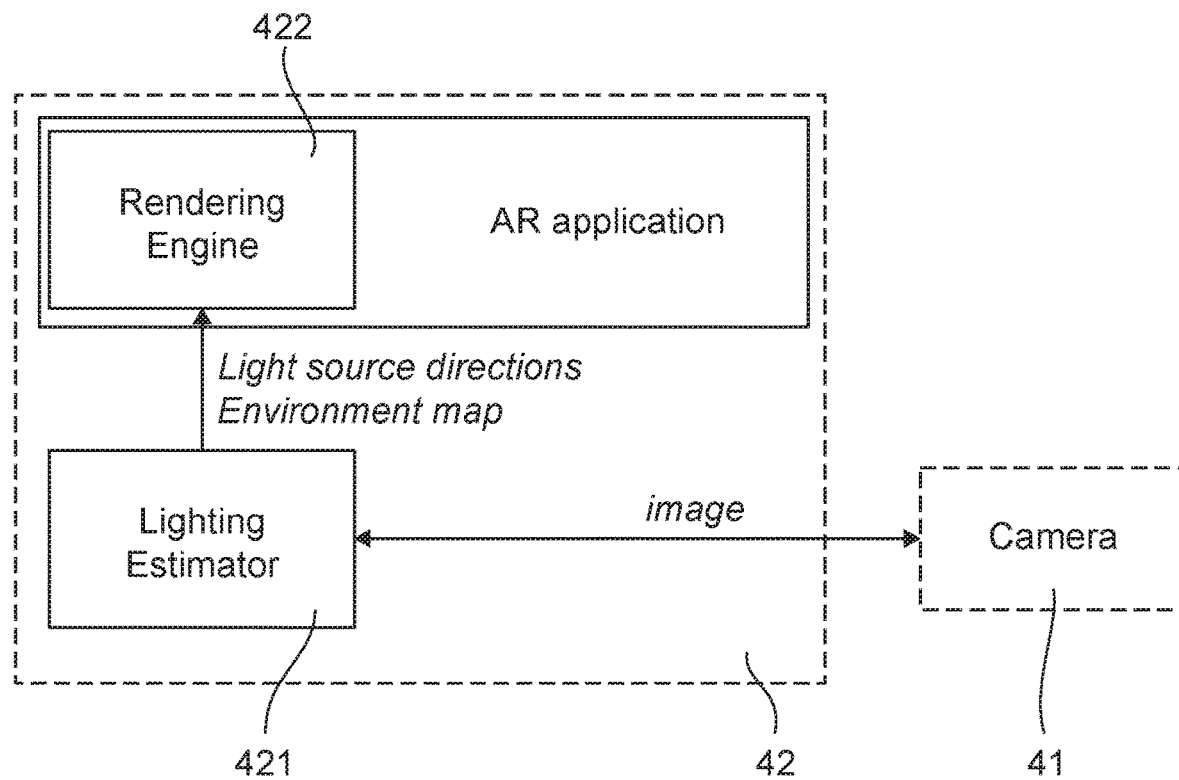
FIG. 4 illustrates an example system for processing a 3D scene, according to some embodiments.

FIG. 4 illustrates an example system for processing a 3D scene, according to some embodiments. As shown in FIG. 4, the system comprises at least one camera 41 sat atop an object, as, e.g., illustrated in FIG. 1 or 3 (but not shown explicitly in FIG. 4), and a device 42, such as for example a mobile phone, a tablet, a head-mounted display, etc. The example system may be used, for example, in an augmented reality (AR) application.

In the embodiment illustrated in FIG. 4, the camera 41 and the mobile device 42 are shown as distinct devices. However, according to another embodiment, the camera 41 may be instead a camera of the mobile device 42 itself.

The camera 41 may be placed in a region of interest. The camera 41 may capture an image of at least a nadir view of the 3D scene, and may send the image to the device 42. To do so, the camera 41 and the device 42 can communicate by a wire or wirelessly, for example using a WiFi or Bluetooth® technology. The image capture can be triggered manually, periodically, or using the device 42 for example. Further, for instance, the camera 41 may be a 360-degrees camera and the image captured by the camera 41 may be a 360° image.

The device 42 may receive the image of the 3D scene captured by at least the camera 41, detect in the image at least one shadow cast by at least one object of the 3D scene acting as a support for the camera 41, and determine a direction of at least one real light source from the detected shadow(s) and at least information representative of the object and known by the device 42, according to at least one embodiment described herein. Such steps may be implemented in a lighting estimator 421 of the device 42.

The device 42 may also determine an environment map from the image captured by the camera 41 and/or by another camera, according to at least one embodiment described herein. According to at least one embodiment, such environment map may be used to determine the direction of the light source(s) in the scene.

According to an aspect of the present disclosure, when the light source(s) of the 3D scene have been estimated, at least one of: (i) a lighting model determined from at least one of a direction, position, or intensity of the real light source(s), and (ii) the environment map, may be stored in a memory of the device 42.

For example, both the lighting model and the environment map may be defined in a reference system that may be attached to the object acting as a support for the camera 41, or that may be attached to the camera 41.

The lighting model and/or the environment map which are locally stored on the device 42 can then be accessed by a rendering engine 422 installed, for example, on the device 42 for augmented reality applications, like inserting an object or an animation at a given place.

For example, the image captured by the camera 41 and displayed on a screen of the device 42 can be mixed with virtual objects. For inserting virtual objects in the 3D scene and obtaining a realistic rendering of the resulting 3D scene, the virtual objects ideally should be lit in a way consistent with the real lighting. To do so, the lighting model can be registered with the pose of the camera 41.

Accordingly, one aspect of the present disclosure comprises (i) positioning, in a virtual scene, the environment map and at least one virtual light source determined from the lighting model, (ii) inserting a virtual object in the virtual scene, and (iii) rendering the virtual scene.

Such positioning comprises, for example, determining a transfer function from the reference system attached to the camera 41 or to the object acting as a support for the camera 41 to a reference system attached to the device 42.

According to an embodiment, the object acting as a support for the camera 41 is used to define a reference 3D coordinate system that is referred to in order to define the direction/position of the 3D light sources and the orientation of the environment map.

For example, a physical image marker may be used to link the light source directions estimated with the camera 41 and used with the device 42. This marker lying on a reference surface or attached to the object acting as a support may be observed by both devices 41 and 42. From the analysis of the image of device 41, the 3D direction/position of the light sources are expressed in the reference coordinate system attached to the marker. The camera of device 41 may be previously calibrated to get its intrinsic parameters. Then, from the analysis of the image of the device 42, the pose of its camera is estimated in the same reference coordinate system.

According to a particular embodiment, the object acting as a support for the camera 41 comprises an axis, like a vertical leg for instance, and the positioning comprises aligning the axis of the object with a direction known by the device 42.

According to a first example, the physical marker image may be aligned with the axis of the object acting as a support for the camera 41 to materialize the 3D coordinate system in which the light sources are modeled. The AR application may be configured to detect the marker and to align the virtual scene with the marker.

According to a second example, the axis or a branch of the object acting as a support for the camera 41 may be configured such as to face the North direction indicated by the device 42 (for example by its compass). According to this example, the coordinate system in which the light sources are modeled may be known in advance.

According to a third example, the estimation of the light source(s) of the 3D scene may further include a registration step where a user aligns a direction of his/her device, such as the device 42, (for example, via a display of a video camera of the device) with a direction of an axis or branch of the object acting as a support for the camera 41, and then presses a button to record this direction.

Once the environment map and/or light sources have been correctly positioned in the virtual scene, a virtual object can be inserted in the virtual scene and correctly lit to provide a realistic aspect of the 3D scene.

The object acting as a support for the camera and the camera can be removed from the real 3D scene when the transfer function between the reference system of the device and the reference system of the object acting as a support for the camera has been determined.

In some embodiments, the object acting as a support for the camera 41 and the camera 41 may also be removed from the virtual 3D scene. It will be appreciated that several techniques are known to remove a camera rig or camera support, for example, from a 360° footage.

As already mentioned above, the estimation of the light source(s) may be regularly updated by, e.g., capturing and sending new images to the device 42. If the light sources are static, then the camera 41 and the object acting as a support for the camera may be removed.

For illustrative proposes, an example of application of various embodiments described herein is now presented. Assume a user wants to play an augmented reality (AR) game on his/her mobile phone, where virtual objects are inserted in front of him/her. Before starting the game, the user puts his/her 360° camera on a support, for example a tripod, in an area (3D scene) where the user wants to play. The user may use his/her mobile phone to estimate light source(s) of the 3D scene, using, for example, a dedicated application including various methods described herein. Such application may be configured to connect the phone to the 360° camera, to trigger the capture of a 360° image, to upload the image and then to compute both an environment map and main light source directions. This information may be then locally stored on the phone. Further, when the user starts the game, a rendering engine (e.g., the rendering engine 422) gets the lighting information from the phone itself to generate realistic shadows and reflections.

Figure 5:
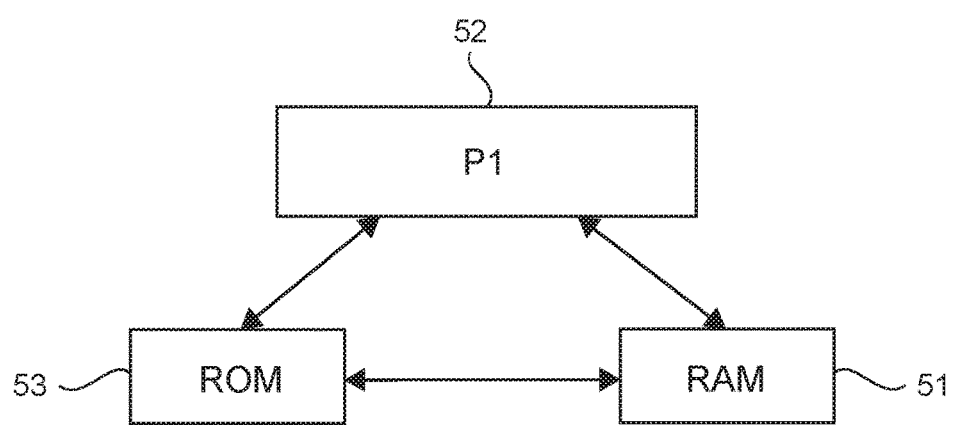
FIG. 5 is a block diagram of an example device for implementing a method for processing a 3D scene, according to some embodiments.

FIG. 5 is a block diagram of an example device for implementing a method for processing a 3D scene, according to some embodiments.

As shown in FIG. 5, such device comprises, for example, a non-volatile memory 53 (e.g. a read-only memory (ROM) (as shown) or a hard disk), a volatile memory 51 (e.g. a random access memory (RAM), as shown) and at least one processor 52, for example a processor P1. The non-volatile memory 53 is a non-transitory computer-readable carrier medium. The memory 53 may be configured to store executable program code instructions, which are executed by the processor 52 in order to enable implementation of methods described herein in accordance with various embodiments.

In particular, in some embodiments, the processor 52 is configured to perform: (i) obtaining an image of at least a nadir view of a 3D scene, captured by at least one camera, (ii) detecting, in the image, at least one shadow cast by at least one object of the 3D scene acting as a support for the at least one camera, and (iii) determining a direction of at least one real light source from the detected shadow(s) and at least information representative of the object.

Upon initialization, in some embodiments, the aforementioned program code instructions are transferred from the non-volatile memory 53 to the volatile memory 51 so as to be executed by the processor 52. The volatile memory 51 likewise includes registers for storing variables and parameters required for this execution.

As a general summary, various embodiments have been described hereinabove.

According to some embodiments, a method for determining information representative of a light source in a 3D scene may include: obtaining an image comprising at least a nadir view of a 3D scene, captured by at least one camera; detecting, in the image, at least one shadow cast by at least one object of the 3D scene acting as a support for the at least one camera; and determining a direction of at least one real light source from the at least one detected shadow and at least information representative of the object.

In some embodiments, the method may further include determining an environment map from the image of the 3D scene, the environment map including a texture image to approximate an appearance of a reflective surface. Determining the environment map, in some embodiments, includes removing the at least one object and the at least one detected shadow from the image of the 3D scene and replacing the at least one object and the at least one detected shadow to provide a realistic aspect of the 3D scene.

Further, in some embodiments, the method may further: include detecting at least one bright area in the environment map; determining a direction of at least one light source candidate from the bright area; and detecting, in a representation of the 3D scene, at least one virtual shadow cast by the object, lit by the at least one light source candidate, wherein the direction of at least one real light source is further determined from the at least one virtual shadow. The method may also include, in some embodiments, determining at least one of a position and an intensity of the at least one real light source from the detected at least one shadow.

Additionally, the method may include, in some embodiments, storing at least one of (i) a lighting model determined from at least one of the direction of the at least one real light source and the position and the intensity of the at least one real light source, and (ii) the environment map that is defined in a reference system. In this regard, in some embodiments, the method may further include positioning, in a virtual scene, the environment map and at least the one virtual light source determined from the lighting model; inserting a virtual object in the virtual scene; and rendering the virtual scene.

In some embodiments, the information representative the object includes a height of the object. Further, in some embodiments, the image is a 360° image. Yet further, in some embodiments, the object acting as a support for the camera has an axis, and the positioning, in the virtual scene, includes aligning the axis of the object with a direction known by a device associated with the at least one camera.

According to some embodiments, a non-transitory computer-readable medium may be configured to store program instructions that, when executed by a processor, cause the processor to perform any of the methods disclosed herein.

According to some embodiments, a device for determining information representative of a light source in a 3D scene, may include at least one processor configured to perform any of the methods disclosed herein.

Also, according to some embodiments, a device for rendering a virtual scene may include a processor configured for determining information on a light source using any of the suitable methods disclosed herein, where the processor may be further configured for: positioning, in a virtual scene, an environment map and at least one virtual light source determined from a lighting model; inserting a virtual object in the virtual scene; and rendering the virtual scene. In such device, in some embodiments, the object acting as a support for the camera has an axis, and the positioning includes aligning the axis of the object with a direction known by the device.

Further, in the devices as disclosed hereinabove, the camera may be a part of any of such devices.

Yet further, according to some embodiments, a system may include: at least one camera; and of the devices disclosed hereinabove. In this regard, in some embodiments, the at least one camera includes at least one processor configured to perform: capturing the image comprising the at least the nadir view of the 3D scene; and sending the image to the device.

Note that, in some embodiments, various steps of a method for processing a 3D scene, according to at least one embodiment of the disclosure as described above, may also be implemented:

by the execution of a set of program code instructions executed by a reprogrammable computing machine, such as a PC type apparatus, a DSP (digital signal processor) or a microcontroller. The program code instructions can be stored in a non-transitory computer-readable carrier medium that is detachable (for example a floppy disk, a CD-ROM or a DVD-ROM) or non-detachable; or by a dedicated machine or component, such as an FPGA (Field Programmable Gate Array), an ASIC (Application-Specific Integrated Circuit) or any dedicated hardware component.

Note, however, that the present disclosure is not limited to a purely software-based implementation, in the form of computer program instructions operating on a processor, but it may also be implemented in hardware form or any form combining a hardware portion and a software portion.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s).

It is also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

The invention claimed is:

1. A method for determining information representative of a light source in a 3D scene, the method comprising:
    obtaining an image comprising at least a nadir view of the 3D scene, captured by at least one camera;
    detecting, in the image, at least one shadow cast by at least one object of the 3D scene acting as a support for the at least one camera; and
    determining a direction of at least one real light source from the at least one detected shadow and from a 3D model of the object.

2. The method according to claim 1, further comprising determining an environment map from the image of the 3D scene, the environment map including a texture image to approximate an appearance of a reflective surface.

3. The method according to claim 1, further comprising removing the at least one object and the at least one detected shadow from the image of the 3D scene and replacing the at least one object and the at least one detected shadow to provide a realistic aspect of the 3D scene.

4. The method according to claim 1 further comprising:
    determining an environment map from the image of the 3D scene;
    detecting at least one bright area in the environment map;
    determining a direction of at least one light source candidate from the bright area; and
    detecting, in a representation of the 3D scene, at least one virtual shadow cast by the object, lit by the at least one light source candidate, wherein the direction of at least one real light source is further determined from the at least one virtual shadow.

5. The method according to claim 1, further comprising determining at least one of a position and an intensity of the at least one real light source from the detected at least one shadow.

6. The method according to claim 5, further comprising storing at least one of (i) a lighting model determined from at least one of the direction of the at least one real light source and the position and the intensity of the at least one real light source, and (ii) the environment map that is defined in a reference system.

7. The method according to claim 6, further comprising:
    positioning, in a virtual scene, the environment map and at least the one virtual light source determined from the lighting model;
    inserting a virtual object in the virtual scene; and
    rendering the virtual scene.

8. The method according to claim 7, wherein the object acting as a support for the camera has an axis, and wherein the positioning comprises aligning the axis of the object with a direction known by a device associated with the at least one camera.

9. The method according to claim 1, wherein the image is a 360° image.

10. A non-transitory computer-readable storage medium having stored instructions that are operative, when executed by a processor, to cause the processor to determine information representative of a light source in a 3D scene by performing:
- obtaining an image comprising at least a nadir view of the 3D scene, captured by at least one camera;
- detecting, in the image, at least one shadow cast by at least one object of the 3D scene acting as a support for the at least one camera; and
- determining a direction of at least one real light source from the at least one detected shadow and from a 3D model of the object.

11. A device for determining information representative of a light source in a 3D scene, wherein the device comprises at least one processor configured to perform:
- obtaining an image comprising at least a nadir view of the 3D scene, captured by at least one camera;
- detecting, in the image, at least one shadow cast by at least one object of the 3D scene acting as a support for the at least one camera; and
- determining a direction of at least one real light source from the at least one detected shadow and from a 3D model of the object.

12. The device according to claim 11, wherein the at least one processor is further configured to perform determining an environment map from the image of the 3D scene, the environment map including a texture image to approximate an appearance of a reflective surface.

13. The device according to claim 11, wherein the at least one processor is further configured to remove the at least one object and the at least one detected shadow from the image of the 3D scene and replace the at least one object and the at least one detected shadow to provide a realistic aspect of the 3D scene.

14. The device according to claim 11, wherein the at least one processor is further configured to perform:
- determining an environment map from the image of the 3D scene;
- detecting at least one bright area in the environment map;
- determining a direction of at least one light source candidate from the bright area; and
- detecting, in a representation of the 3D scene, at least one virtual shadow cast by the object, lit by the at least one light source candidate, wherein the direction of at least one real light source is further determined from the at least one virtual shadow.

15. The device according to claim 11, wherein the at least one processor is further configured to perform determining at least one of a position and an intensity of the at least one real light source from the at least one detected shadow.

16. The device according to claim 11, wherein the direction of the real light source is further determined based on a height of the object.

17. The device according to claim 11, wherein the image is a 360° image.

18. A system comprising:
- at least one camera; and
- the device according to claim 12.

19. The system of claim 18, wherein the at least one camera comprises at least one processor configured to perform: capturing the image comprising the at least the nadir view of the 3D scene and sending the image to the device.

* * * * *